Figure 1:
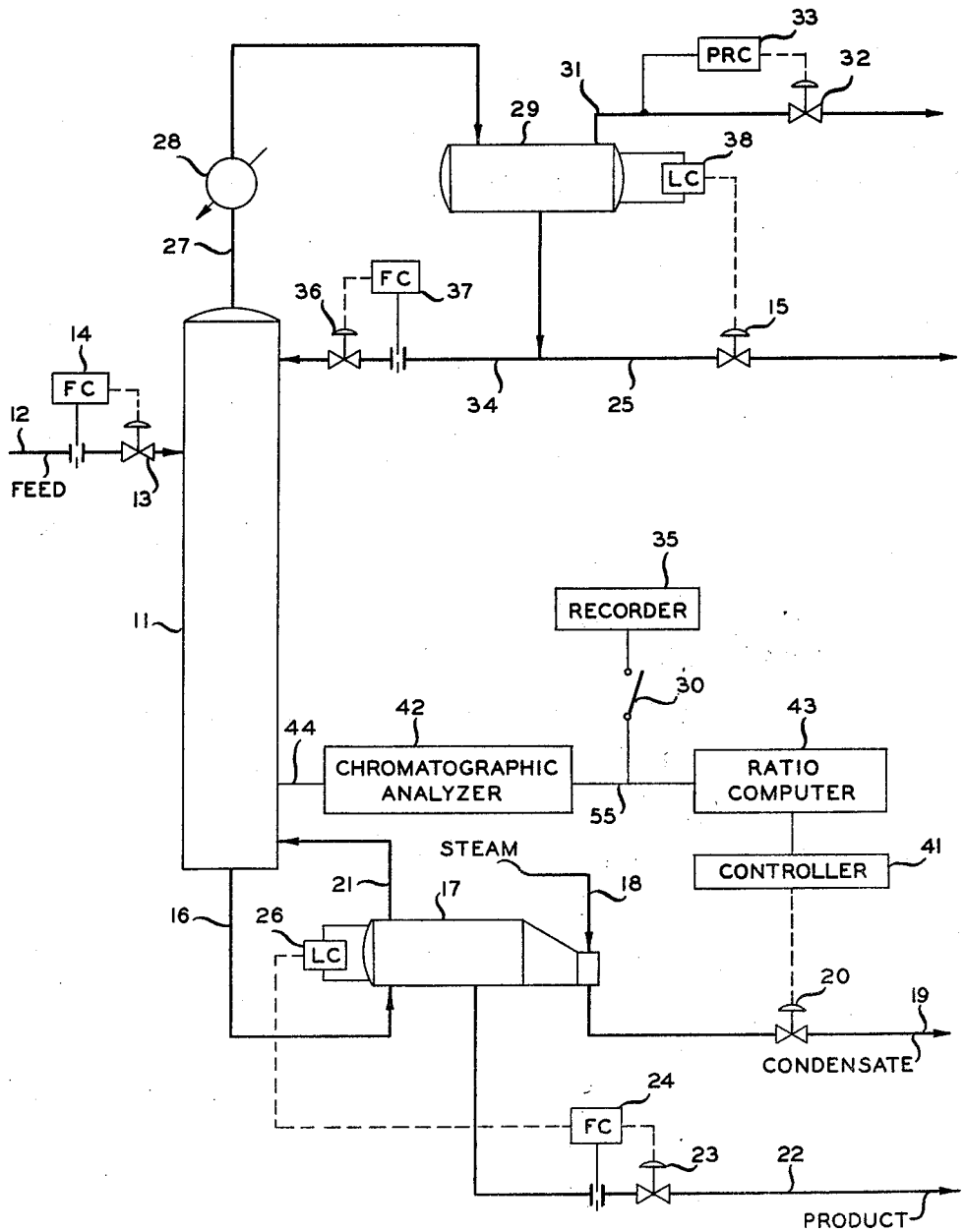

United States Patent Office 3,177,138
Patented Apr. 6, 1965

3,177,138
PROCESS CONTROL BY GAS CHROMATOGRAPHY
Owen D. Larrison, Borger, Tex., assignor to Phillips
Petroleum Company, a corporation of Delaware
Filed May 2, 1960, Ser. No. 26,069
2 Claims. (Cl. 208—351)

This invention relates to a method and apparatus for gas chromatographic analysis. In another aspect it relates to a method and apparatus for monitoring and/or automatically controlling by a feedback system a process using the gas chromatographic analytical procedure. In another aspect it relates to a method and apparatus for the automatic continuous feedback process control of a process variable, for example the heat input of a deethanizer column in a natural gasoline plant.

The elution method of gas chromatography has recently received widespread attention and application as an analytical procedure. This method of analysis briefly comprises separating the components of a gaseous mixture in a small column packed with certain contacting material. The gaseous sample of known volume is introduced into an inert gas stream which functions as a carrier or elutant. The mixture of carrier gas and sample is passed onto the packed column and the continued flow of carrier gas through the column causes the separation of the components in the sample. The components of the sample subsequently appear separately in the column effluent with the carrier gas. Detection of the components in the column effluent is accomplished by means of a detector which responds to a change, caused by the presence of a sample component, in a selected property of the carrier gas, the response of the detector being converted to a signal which can be transmitted to a suitable recorder and/or transmitted to a control loop for the purpose of controlling a manipulated process variable, such as heat input.

In the conventional gas chromatographic procedure using the elution technique, pure carrier gas is passed through the reference side of the detector before a sample of gas of known and determinable volume is introduced into the carrier gas at a point downstream of the reference side of the detector and upstream of the column. The column effluent containing the sample components in the carrier gas is passed to the sensing side of the detector. The responses of the detector to the pure carrier gas and column effluent are balanced against each other and changes caused by the presence of sample components are used to produce a signal which can be used in making a continuous recording of detector response for the purpose of qualitatively and quantitatively evaluating the sample.

There are several obstacles to the widespread use and application of the elution method of gas chromatography, such as the complexity of certain gaseous mixtures, the lengthy holdup or analysis time, the inherent difficulty of obtaining reproducible sample size volumes, the necessity of completely analyzing many samples, etc.

Figure 2:
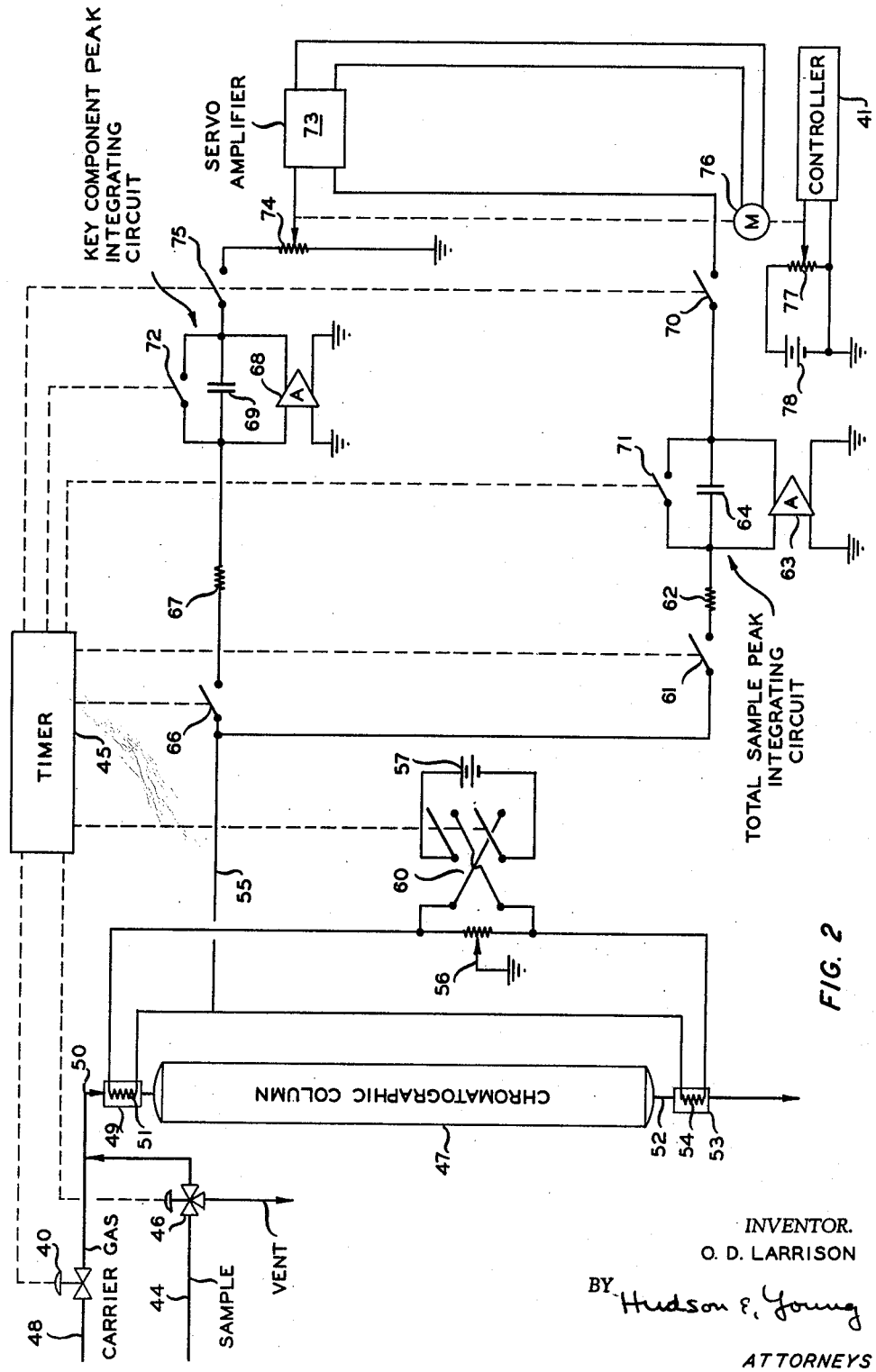
Figure 3:
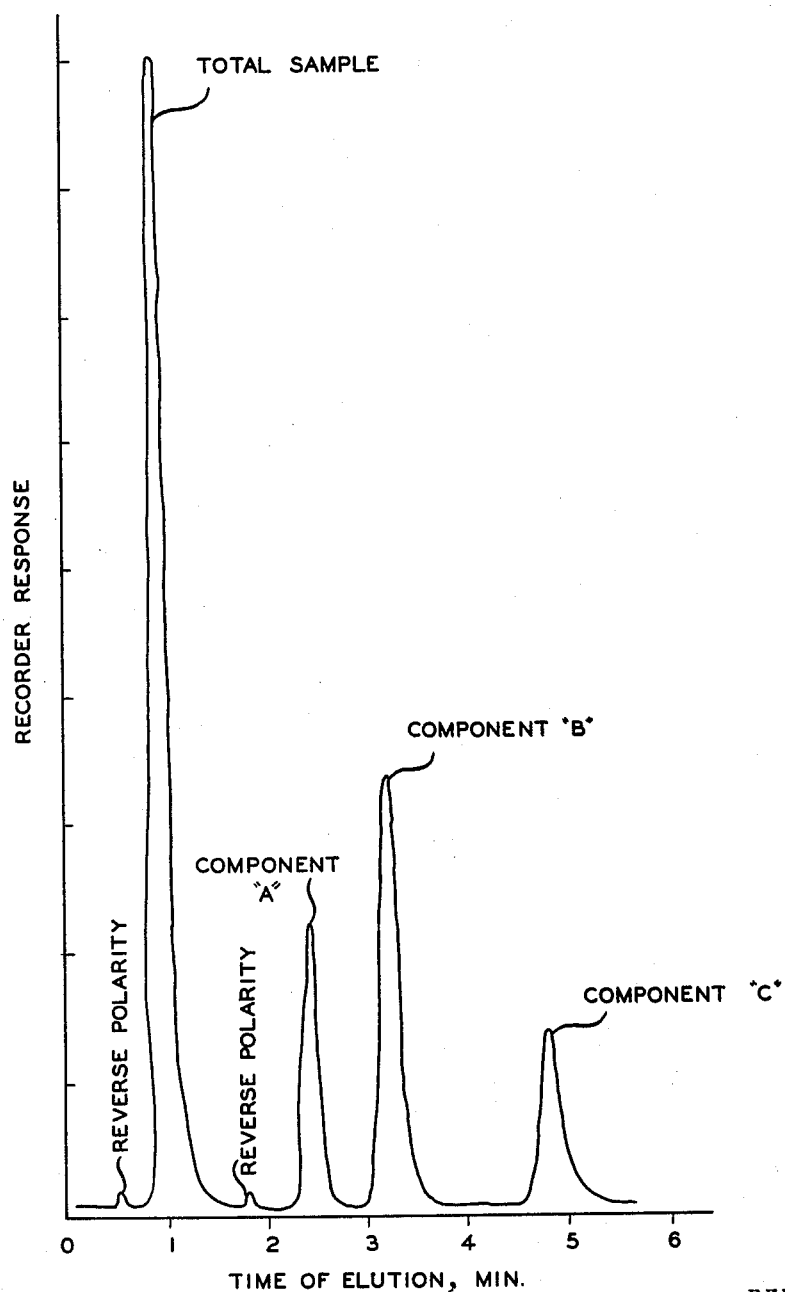

Accordingly, an object of this invention is to expand the usefulness and applicability of the gas chromatographic procedure. Another object is to provide an improved method and apparatus for gas chromatographic analysis. Another object is to provide an improved method and apparatus for monitoring and/or automatically controlling a process variable by means of gas chromatography. Another object is to provide an improved automatic continuous feedback process control of a process variable, such as temperature, pressure, and rate of flow. Another object is to provide an automatic continuous feedback process control of the heat input of a fractionator or the like, such as the deethanizer column in a natural gasoline plant. Another object is to provide an improved gas chromatographic analyzing system, using the elution technique, that is fast, accurate, and not dependent on strict control of reproducible sample size volumes or dependent on the complete analysis of a sample. A further object is to provide an improved gas chromatographic analyzing system which can be used as a guide in monitoring and controlling a process, or used to automatically control a process, such that operation changes in the process can be immediately sensed and action taken to immediately control such process, for example to improve recovery or operating conditions of the process. Further objects and advantages of this invention will become apparent from the following discussion, appended claims, and accompanying drawing in which:

FIGURE 1 is a schematic flow diagram of a typical process, e.g., a fractionator system, having the process control features of this invention associated therewith;

FIGURE 2 schematically illustrates circuitry of one embodiment of the process control system of this invention; and FIGURE 3 illustrates a typical chromatogram obtained by the practice of this invention.

Briefly, the improved gas chromatographic analyzing procedure of this invention comprises passing a mixture of inert carrier gas and gaseous or vaporized liquid sample through the reference side of a chromatographic detector and thence through a packed chromatographic column where one or more key components of the sample are eluted and separated by continuous flow of carrier gas through the column. The column effluent then passes through the sensing side of the detector. The differential detector output is recorded, and the ratio of the response of the detector to the total sample passing through the reference side of the detector to the response of the detector to a key sample component in the column effluent is then computed. The computed ratio of the sample under consideration can be compared with the computed ratio of calibration samples for purposes of laboratory analysis, spot checks on process operation, or as a guide for process control. The computed ratio of continuous cyclic samples can be used to produce a continuous signal corresponding to the composition change of the key component in a process and used to adjust a manipulated variable, such as the rate of flow of steam to a reboiler.

Referring now to the drawing, and to FIGURE 1 in particular, a conventional fractionator column 11 is shown, such as a deethanizer column in a natural gasoline plant. Fractionator column 11 can be provided with the usual vapor-liquid contact equipment, such as a plurality of trays (e.g., 40) and the like, and other conventional fractionator appurtenances. Feedstock, such as demethanizer bottoms, is introduced by line 12 to the column 11 (e.g., at the 20th tray) at a predetermined flow rate maintained by valve 13 which is controlled by flow rate controller 14. Fractionator bottoms, for example, a stream comprising mainly $C_3$, $C_4$ and $C_5$ hydrocarbons, are withdrawn as kettle product via line 16 and passed to an external reboiler 17 where the kettle product is indirectly heat exchanged with a heat exchange medium, such as steam, supplied via line 18, the used heat exchange medium, such as condensate, being withdrawn via line 19 having flow control valve 20 regulating the flow thereof. Vaporized kettle product is recycled via line 21 to the bottom of fractionator column 11 (e.g., above the first tray) and liquid product withdrawn from reboiler 17 via line 22, the flow therein being regulated by flow control valve 23 which is in turn maintained by flow recorder controller 24 overridden by liquid level controller 26.

The low boiling constituents of the feed mixture, for example, overhead comprising mainly methane and ethane, are removed from the column through line 27, the overhead product being cooled by means of cooler 28. The cooled overhead is passed to a reflux accumulator 29, from which uncondensed gases are withdrawn via line 31 having flow control valve 32 therein regulated by pressure controller 33. Some condensed liquid is passed from accumulator 29 via line 34 to the column 11 as reflux, flow of the reflux liquid being regulated by flow control valve 36, and the balance of condensate (if any) passed via line 25 having valve 15 adjusted by liquid level controller 38.

It should be understood that the subject invention is not be limited to the process illustrated in FIGURE 1, since the latter is merely illustrative of a process having one or more manipulated variables such as flow rate, pressure, temperature, etc., which can be monitored and/or automatically controlled by the practice of this invention.

In the fractionation of a fluid mixture, the concentration of a key component or the relative concentrations or ratios of key components at any point in the system, for example on a particular tray, in the charge, overhead product, or bottoms product, can often be calculated or determined from past experience. For a product having certain specification, or in order to obtain a certain recover, or for other reasons, it is often necessary and desirable to maintain one key component at a certain concentration or the ratio of two components at some level or point in the fractionator system. In order to achieve these objects, one or more manipulated variables, such as heat input, can be regulated and controlled. Thus, it is often desirable and necessary to analyze fluid mixtures in the process to determine the concentrations of one or more key components. While many different gas chromatographic procedures, includnig those employing the elution technique, have been proposed, patented or used, to achieve these objects, many of these procedures are either unsatisfactory or limited in applicability, many of these procedures inherent long time lags, or are dependent upon exactly reproducible sample sizes, tedious batch analyses, or complete separation and analysis of sample components.

According to my invention, samples of a fluid mixture undergoing fractionation, or samples of the charge, overhead, sidestream, or kettle product, etc., are periodically or substantially continuously withdrawn, according to the nature of the process and purpose of analysis, and cyclically passed to an novel chromatographic analytical procedure for determining the relative concentration of one or more key components.

Referring again to FIGURE 1, fluid mixture undergoing fractionation is continuously withdrawn from column 11, for example from the first tray, via line 44 and passed to a chromatographic analyzer 42 where samples are cyclically analyzed, the detector being responsive to the total, unresolved sample and one or more eluted key components of interest. According to one embodiment, differential detector responses can be transmitted by electrical conductor 55 to recorder 35, upon the closing of recorder switch 30, where the responses of the detector are recorded as chromatograms on a conventional strip chart, such as that illustrated in FIGURE 3.

The chromatographic analyzer is shown in FIGURE 2 where a sample of the fluid mixture removed from column 11 of FIGURE 1 via line 44 is passed from sample valve 46 to the inlet line 50 of a packed chromatographic column 47. Carrier gas, such as helium, is continuously passed via line 48 to inlet line 50 to sweep the sample through the reference channel 49 of a detector, such as a thermal conductivity cell having temperature sensitive element or thermistor 51 therein, the mixture of carrier gas and sample then being passed onto the packing in column 47. Carrier gas flow and sample flow are controlled by valves 40, 46, operated in response to signals from a suitable timer 45, or other programmer. During the period when a sample is not being trapped by valve 46, the fluid mixture is passed to vent. The carrier gas tends to force the sample through the column, the several components of the sample traveling through the column at different rates of speed, depending on their affinities for the contact material. The components, such as ethane and propane, thus appear in the column effluent at spaced time intervals, the order of appearance being known from past experience or previous calibration runs with known samples. The column effluent passes through the sensing channel 53 of a detector, such as that of a thermal conductivity cell having a temperature sensitive element or thermisor 54 therein. The temperature sensitive elements 51 and 54 are part of a Wheatstone bridge comprising potentiometer 56 and a voltage source 57. By this arrangement, the thermal conductivities of the fluids flowing through detector channels 49, 53 are compared and voltages representative of the detector responses are generated and transmitted by conductor 55. These detector responses can be transmitted to the recorder 35 of FIGURE 1, and/or to peak indicating and comparing circuitry such as that shown in FIGURE 2, where the ratio of the magnitude of the total, unresolved sample peak of the magnitude of the key component peak is computed, using either peak heights or areas for this purpose.

In order for the detector responses to the total sample and key components to have the same character, the Wheatstone bridge system can have incorporated therein a suitable polarity reversing switch 60 controlled by timer 45.

FIGURE 3 illustrates a typical chromatogram of one sample analyzed according to the subject invention. This chromatogram illustrates responses of the detector to the total, unresolved sample, and eluted components A, B, and C, in the form of peaks, the magnitude of the components' peaks being in direct relation to the concentrations thereof in the sample. Although the detector responses of three components are recorded on the chromatogram, it is within the secope of this invention to record the total sample peak and only one component of interest, either component A, B, or C, or any other component; the detector responses of those components not of interest need not be recorded, recorder switch 30 of FIGURE 1 being closed only when it is desired to record the detector responses of the total sample and only the component(s) of interest. For example, if one were interested in only component B, recorder switch 30 would be opened (e.g., by timer 45) during the appearance of components A and C in the column effluent and closed during the flow of the total sample through the detector reference channel 49 and during the flow of component B through detector sensing channel 53. In fact, after the appearance of key components(s) in the column effluent, further elution and analysis of the balance of the sample need not be carried out, and timer 45 can be programmed to effect purging of the column to prepare it for the next sampling and analysis cycle, thereby increasing the rapidity of the continuous cyclic analysis procedure.

I have discovered that the ratio of the magnitude of a component's detector response, or peak, to the magnitude of the unresolved total sample's detector response, or peak, is directly related to the concentration of the component in the sample. Said magnitudes can be based on the height or area of the respective chromatogram peaks, or the voltage outputs from the detector.

I have further found that although analyses of samples of the same fluid mixture may not produce the same magnitudes for the same sample components and total unresolved samples, the ratios between the component and the total sample will always be substantially equal. Thus, the subject invention does not require, for application and accuracy, exactly reproducible sample volumes in the case of continuous cyclic analysis.

By carrying out calibration runs in the apparatus of this invention, using samples of known concentrations and compositions similar to those of unknown concentrations to be subsequently analyzed, it is possible to translate the aforementioned ratio of peak magnitudes into concentration. This can be accomplished, where the analysis is made for purposes of spot checking or as a guide for process control, by the use of calibration curves containing plots of said ratio against concentration (mol or volume percent) of components of interest, obtained from calibration samples.

For example, looking at FIGURE 3, assume that the heights of the peaks or recorder responses for component A and the total sample are 56.4 units and 227.0 units, respectively. The corresponding ratio of peak heights would be 56.4/227.0, or 0.249, which multiplied by 100 percent is equivalent to 24.9 percent A, the approximate concentration of component A in the fluid mixture analyzed. Due to thermal conductivity abbreviations or the like, this concentration may only be approximate, and for many purposes adequate. By using calibration charts or the like, the ratio of peak magnitudes as determined for process samples can be compared with that of calibrations samples and the more accurate concentration of the component of interest found. For example, in the above illustration, use of a calibration chart may result in determining that said component A is more accurately 25.1 percent.

As mentioned hereinbefore, the ratio of the detector response to the component of interest to that of the total unresolved sample can be electrically computed, and used in a feedback process control loop. This will be described now, with reference to FIGURE 2 where all of switches in the circuitry of FIGURE 2 are controlled by the operation of timer 45; the latter also may be used to control operation of recorder switch 30. Prior to and after the total sample is swept through reference channel 51, timer 45 operates the polarity reversing switch 60. During the time that the total, unresolved sample appears in reference channel 49, e.g., during time intervals $t_s$, switch 61 is closed by timer 45 and the voltage change in the Wheatstone bridge due to the flow of the total sample pass thermistor 51 is applied by conductor 55 to a total sample peak integrating circuit, this voltage change being applied across resistance 62 to an operational amplifier 63 shunted by a condenser 64 in the feedback circuit of the amplifier. At the end of time interval $t_s$, timer 45 reverses polarity switch 60 and opens switch 61, leaving the voltage representative of the total sample peak stored on condenser 64. When the key component appears in the effluent during time interval $t_c$, timer 45 maintains switch 66 in a closed position, thereby allowing the voltage generated during time interval $t_c$ to be applied to a key component integrating circuit, said voltage being applied across resistance 67 to operational amplifier 68 shunted by condenser 69 in the feedback circuit of amplifier 68. At the end of time interval $t_c$, timer 45 opens switch 66 leaving the voltage representative of the key component peak stored on condenser 69.

During the time intervals that components of the sample other than the key component appear in effluent 52, the timer 45 maintains switches 61, 66 in their open positions, these other sample components being passed through sensing channel 53 to vent without the changes in the Wheatstone bridge occasioned thereby being transmitted by conductor 55. These other components may appear in the effluent either before or after that of the key component under consideration, this order of elution being known from past experience or from calibration runs. With this knowledge, timer 45 can be programmed so that the only voltage changes in the Wheatstone bridge which are transmitted by conductor 55 are those due to the passage of the total, unresolved sample through reference channel 49 and the eluted key component through sensing channel 53. During subsequent sampling cycles, timer 45 operates the various switches in the same sequence, starting with the reversal of polarity switch 60. It is also within the scope of this invention to program the operation of the carrier gas flow control valve 40 so that after the key component has been detected the flow of carrier gas can be increased to purge the column and quickly put it in condition for another sample cycle. It is also within the scope of this invention to provide column 47 with suitable, conventional thermal means which can be actuated by the programmer to raise the temperature of the column after the key component has been detected, in order to hasten purging of the column.

After the detection of the total, unresolved sample peak and the eluted key component peak during a sample cycle, timer 45 closes switches 70 and 75 connected to the two integrating circuits. The integrated voltage of the total sample is then applied to one input terminal of servo-amplifier 73, and the integrated voltage of the key component is applied through motor-adjustable potentiometer 74 to the second input terminal of servo-amplifier 73. Servo-amplifier 73 can be any conventional device of this type, such as that described in Electronics Control Handbook, Batcher and Moulic, Caldwell-Clements, Inc., New York, 1946, page 98. The output of servo-amplifier 73 is applied to a servo-motor 76 which adjusts the contactor of potentiometer 74 in an amount equal to the ratio of the voltage of the total sample to the voltage of the key component to balance the second input voltage against the first input voltage. Servo-motor 76 simultaneously adjusts the contactor of potentiometer 77 shunted by battery 78, to supply an electrical signal to controller 41 equal to said computed ratio.

Controller 41 can be any conventional commercially available device which converts an input electrical voltage into a corresponding output pneumatic pressure, a transducer of this type being described in Bulletin A-710, of the Swartwout Company, Cleveland, Ohio. This pneumatic signal resets a valve positioner, for example of the type described in Foxboro Industrial Instrumentation Bulletin 456, page 112, which adjusts the flow control valve 20 in the condensate line 19 of FIGURE 1. For example, if the computed ratio is greater than that of the desired ratio, flow control valve 20 will be opened an incremental amount so as to increase the heat input to the desired extent necessary to maintain the desired ratio, and vice versa.

Before starting another sample cycle, timer 45 opens switches 70, 75, momentarily closes switches 71, 72 to discharge condensers 64, 69 and then opens switches 71, 72, to begin another sample cycle.

The automatic continuous feedback process control of this invention can be applied to any process having a manipulative variable, such as temperature, pressure, rate of flow, etc. Representative processes which can thus be controlled include coking, thermal cracking, catalytic cracking, solvent extraction, catalytic reforming, thermal reforming, hydrogenation, dehydrogenation, hydrodesulfurization, isomerization, alkylation, polymerization, fractional crystallization, adsorption, absorption, and the like. This invention is particularly suitable for controlling the operation of various fractionators in a natural gasoline plant: the methane concentration in the overhead and the methane and ethane content in the bottoms of a demethanizer; the ethane in the overhead and the ethane and propane in the bottoms of a deethanizer; the propane in the overhead and the propane and n-butane in the bottoms of a depropanizer; the isobutane in the overhead and the isobutane and n-butane in the bottoms of a deisobutanizer; the n-butane in the overhead and the n-butane and pentanes in the bottoms of a debutanizer; the isopentane in the overhead and the isopentane and n-pentane in the bottoms of a deisopentanizer; etc. The proper sample source of the various columns can be determined by analyzing samples from various points in the fractionator, e.g., charge, overhead product, bottoms product, various tray levels. In order to change composition throughput, one or more of the manipulated variables can be controlled, such as temperature, pressure, flow rate, or even the operation of preceding units. For example, in controlling fractionation, column pressure, column bottom temperature, quantity of reflux, quantity of reboiled fluid, quantity of heat exchange fluid, quantities of feed, overhead, sidestream, or bottoms, etc., can be controlled.

Various modifications and alterations of this invention will become apparent to those skilled in the art without departing from the scope and spirit of this invention, and it should be understood that the foregoing discussion and accompanying drawing are not to be construed to unduly limit this invention.

I claim:

1. In a method of controlling a process having a manipulated process variable, wherein a sample of gas mixture is obtained from said process and analyzed by gas chromatography wherein a sample of said gas mixture in a stream of inert carrier gas is introduced onto a packed chromatographic column, said sample is eluted by continuing the passage of said stream of carrier gas into said column to cause the separation of at least one sample component of interest, and a stream of carrier gas containing at least one separated sample component of interest is withdrawn as effluent from said column, the improvement comprising passing said stream of carrier gas through the reference zone of a chromatographic detector into and through said column and then into and through the sensing zone of said detector, subsequent to the commencement of passage of carrier gas through said sensing zone introducing said sample into said stream of carrier gas at a point upstream of said reference zone and passing said stream of carrier gas containing said sample through said reference zone prior to passing the same onto said column and passing effluent from said column through said sensing zone of said detector while continuing the passage of carrier gas through said reference zone and into said column to provide at a first point of time only carrier gas in said sensing zone and carrier gas plus said sample in said reference zone and at a second subsequent point of time only carrier gas in said reference zone and carrier gas plus said separated component in said sensing zone, detecting at said first point of time a change in a selected property of said carrier gas passing through reference zone due to the presence of said sample of gas mixture, and establishing a first signal representative of the thus detected change, establishing and storing a second signal representative of the integral of said first signal, and detecting at said second point of time a change in said selected property of the carrier gas passing through said sensing zone due to the presence of said separated component therein and establishing a third signal representative of the thus detected change, establishing and storing a fourth signal representative of the integral of said third signal, establishing responsive to said stored second and fourth signals a fifth signal representative of the ratio of said second and fourth signals and thus representative of the concentration of said component in said sample, establishing a sixth signal representative of a predetermined desired concentration of said component in said gas mixture, comparing said fifth and sixth signals and establishing a seventh signal representative of the difference between said fifth and sixth signals, and controlling said process variable responsive to said seventh signal.

2. Apparatus for controlling a process having a manipulated process variable responsive to the concentration of a preselected component in a gas mixture comprising a packed chromatographic column, first conduit means for introducing carrier gas into said column, second conduit means for withdrawing gas effluent from said column, first detecting means operatively positioned in said first conduit means, second detecting means operatively positioned in said second conduit means, means for obtaining a sample of said gas mixture and subsequent to the commencement of passage of carrier gas from said column into and through said second detecting means introducing said sample into said first conduit means upstream of said first detecting means and continuing the passage of carrier gas through said first detecting means into said column to provide at a first point of time only carrier gas in said second detecting means and carrier gas plus said sample in said first detecting means and at a second subsequent point of time only carrier gas in said first detecting means and carrier gas plus said component in said second detecting means, a bridge network having first and second output terminals and first and second power terminals, said first detecting means being connected in one arm of said bridge network, said second detecting means being connected in a second arm of said bridge network, means for applying a direct current voltage of a first polarity to said first and second power terminals during the time said sample is passing through said first detecting means and for applying a direct current voltage of opposite polarity to said first and second power terminals during the time said component is passing through said second detecting means, said bridge network being adapted to detect at said first point of time a change in a selected property of said carrier gas passing through said first detecting means due to the presence of said sample therein and to establish a first signal representative of the thus detected change and to detect at said second point of time a change in said selected property of the carrier gas passing through said second detecting means due to the presence of said component therein and to establish a second signal representative or the thus detected change during said second point of time, first and second integrating and storage circuits, means for applying said first signal to the input of said first integrating and storage circuit and for applying said second signal to the input of said second integrating and storage circuit, means responsive to the stored outputs of said first and second integrating and storage means for establishing a third signal representative of the ratio of the outputs of said first and second integrating means and thus representative of the concentration of said component in said sample, means for establishing a fourth signal representative of a predetermined desired concentration of said component in said gas mixture, means responsive to said third and fourth signals for establishing a fifth signal representative of the difference between said third and fourth signals, and means for controlling said process variable responsive to said fifth signal.

References Cited by the Examiner
UNITED STATES PATENTS

| | | | |
|---|---|---|---|
| 2,692,820 | 10/54 | Alway et al. | 183—2 |
| 2,764,536 | 9/56 | Hutchins | 62—37 X |
| 2,826,908 | 3/58 | Skarstrom | 183—2 |
| 2,835,116 | 5/58 | Miller | 62—21 |
| 2,951,361 | 9/60 | Fuller | 73—23 |
| 3,009,864 | 11/61 | Webb | 73—23 X |

RICHARD C. QUEISSER, *Primary Examiner.*

W. C. COLE, JOSEPH P. STRIZAK, *Examiners.*